D. A. MESSNER.
TIRE.
APPLICATION FILED JUNE 21, 1915.
1,233,279.
Patented July 10, 1917.
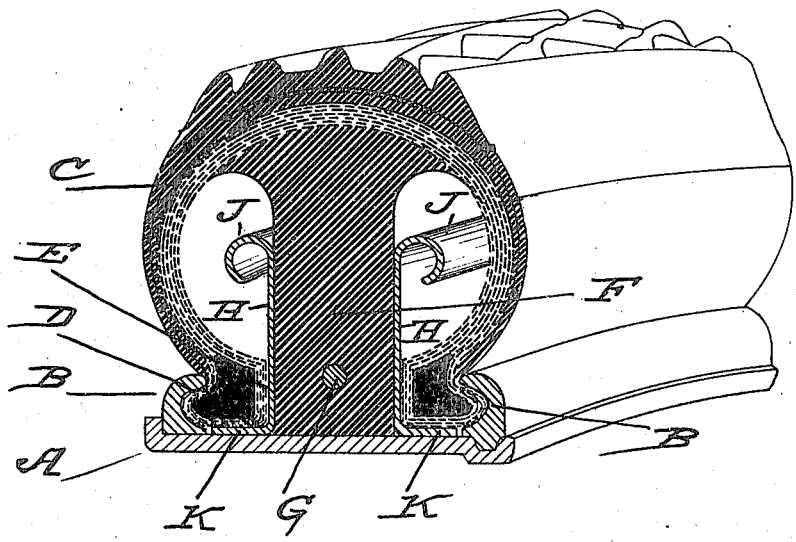
Witnesses
Ira M. Jones
M. E. Moore
David A. Messner
Inventor
By 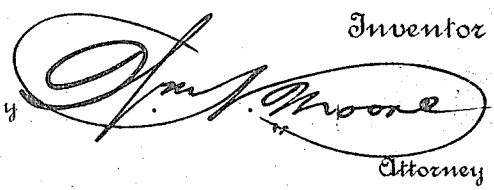
Attorney

UNITED STATES PATENT OFFICE.

DAVID A. MESSNER, OF AKRON, OHIO, ASSIGNOR OF ONE-THIRD TO SAMUEL A. MESSNER, OF AKRON, OHIO.

TIRE.

1,233,279.  Specification of Letters Patent.  Patented July 10, 1917.

Application filed June 21, 1915. Serial No. 35,280.

*To all whom it may concern:*

Be it known that I, DAVID A. MESSNER, a citizen of the United States, residing at Akron, in the county of Summit and State of Ohio, have invented certain new and useful Improvements in Tires, of which the following is a specification.

My invention relates to improvements in tires, and refers particularly to what are known as cushion tires.

One object of the invention is the provision of a tire which will possess the necessary resiliency but which will be absolutely proof against puncture, thus insuring a tire which will have a long life and prove highly desirable and efficient.

Another object of my invention is the provision of a tire capable of supporting a very heavy load which will be absolutely proof against lateral or side motion under all conditions, and which will be inexpensive and thoroughly practical in every respect.

With these objects in view my invention consists of a tire, embodying a casing or shoe, a supporting rib and means for bracing and retaining the rib in position under all circumstances.

The invention also consists of a tire of the type stated embodying novel features of construction and combination of parts for service substantially as shown and described herein.

The single figure represents a view in section and perspective of a tire constructed in accordance with and embodying my invention.

The letter A, designates the rim of the wheel and B designates the clenching or fastening rings in connection with which my tire is particularly adapted for use.

The tire consists of the shoe or casing C, of composite construction, formed with the outer flanges D, having the inner flat faces E, which normally lie contiguous to the inner edge of the central vertical supporting rib F.

This rib is preferably made of elastic material, of the proper resiliency and formed integral with and extending inwardly from the wall of the casing to the rim to provide a support of the most efficient character, being reinforced by the metal ring or band G, embedded in said supporting rib.

From this construction it will be noted that the tire is clamped or secured upon the rim and that the supporting rib is secured by the casing and its fastening means, and to further insure the rib being retained in a vertical position, I provide the pair of flat metal bands H, which rest against the flat sides of the rib and have upper curved edges J. The rib F is also curved at its junction with the casing to allow a proper movement of the casing and to prevent injury thereto when a hard blow is given the tire, and the plates have their bases or inner edges formed with flanges K, disposed at a right angle and forming base supports which rest upon the rim.

It will thus be seen that I provide a tire which dispenses with the inner tube and which cannot be affected by punctures or injury; which possesses the necessary elasticity and will support a heavy load; which will prevent side or lateral movement and avoid skidding; and which generally is efficient, reliable and practical.

The vital and important feature of my invention resides in the casing with rib and lateral flanges in combination with the sustaining or retaining metal bands which act jointly to produce the best results under all conditions.

It will also be apparent that my tire will prove desirable for service upon trucks, fire engines, or other heavy vehicles by reason of the fact that its construction will sustain a heavy load and with the necessary spring or elastic action.

I claim:

In a tire, the combination with a rim and a casing having its edges spaced and an interior rib extending inwardly from the inner wall of the casing to rest on the rim and confined between said edges, of a pair of plates having each a vertical wall resting flat against the sides of said rib and a right angled flange formed on their inner edges and supported upon said rim and between the rim and edges of the casing, and means for retaining the edges of said casing, said plates having their outer edges laterally outwardly curved and said interior rib being curved at its junction with the casing to prevent injury thereto when a hard blow is given the tire.

In testimony whereof I affix my signature in presence of two witnesses.

DAVID A. MESSNER.

Witnesses:
DAVID I. EVANS,
WILLIAM F. WOTRING.

Copies of this patent may be obtained for five cents each, by addressing the "Commissioner of Patents. Washington, D. C."